United States Patent
Martello et al.

(10) Patent No.: US 7,011,042 B2
(45) Date of Patent: Mar. 14, 2006

(54) HIGH WALLED LITTER BOX WITH LITTER RETURN ENTRY

(76) Inventors: Donnie Martello, 2860 Yonkers Ct., Oviedo, FL (US) 32765; Amy Dunn, 2860 Yonkers Ct., Oviedo, FL (US) 32765

( * ) Notice: Subject to any disclaimer, the term of this patent is extended or adjusted under 35 U.S.C. 154(b) by 0 days.

(21) Appl. No.: 10/838,271

(22) Filed: May 5, 2004

(65) Prior Publication Data

US 2005/0263088 A1   Dec. 1, 2005

(51) Int. Cl.
    *A01K 29/00*   (2006.01)
(52) U.S. Cl. .................................. 119/165
(58) Field of Classification Search ........ 119/165, 119/166, 168, 170; D30/161, 162
    See application file for complete search history.

(56) References Cited

U.S. PATENT DOCUMENTS

| | | | | |
|---|---|---|---|---|
| 3,885,523 A * | 5/1975 | Coleman | ............ | 119/165 |
| 4,517,920 A * | 5/1985 | Yamamoto | ............ | 119/166 |
| 4,926,794 A * | 5/1990 | Yamamoto | ............ | 119/165 |
| 5,134,974 A * | 8/1992 | Houser | ............ | 119/168 |
| 5,303,675 A * | 4/1994 | Van Den Bergh | ............ | 119/165 |
| 5,329,878 A * | 7/1994 | McCauley | ............ | 119/165 |
| 5,361,725 A * | 11/1994 | Baillie et al. | ............ | 119/165 |
| 5,590,623 A | 1/1997 | Toole et al. | | |
| 5,676,090 A | 10/1997 | Cannady, Jr. | | |
| 5,782,203 A * | 7/1998 | Tennen | ............ | 119/166 |
| 5,855,186 A * | 1/1999 | Larsen et al. | ............ | 119/166 |
| 6,065,429 A | 5/2000 | Crosse | | |
| 6,205,953 B1 | 3/2001 | Ginn | | |
| 6,237,534 B1 | 5/2001 | Schwartz | | |
| 6,371,048 B1 * | 4/2002 | Smith | ............ | 119/166 |
| D467,041 S * | 12/2002 | Cortes-Reuter | ............ | D30/109 |
| 6,494,165 B1 | 12/2002 | Asbury | | |
| 6,659,045 B1 * | 12/2003 | Thompson | ............ | 119/482 |

* cited by examiner

*Primary Examiner*—Teri Pham Luu
*Assistant Examiner*—Bret Hayes
(74) *Attorney, Agent, or Firm*—Siemens Patent Services, LC

(57) ABSTRACT

A high walled litter box having a high entry platform which forces an animal to climb up onto the platform to enter/exit the box, the high walls blocking soiled litter and misdirected waste from being thrown from the box. The entry platform includes a grate with apertures therethrough which allows any litter clinging to the animal to drop through to a sloping floor which returns the litter to the interior of the litter box. A scoop rack has a similar design which returns any litter clinging to the scoop to the interior of the box. A bag clip at the top of one of the walls hold one side of a bag so that a user may hold the bag open with only one hand to facilitate the removal of animal waste or soiled litter to the bag.

15 Claims, 4 Drawing Sheets

HIGH WALLED LITTER BOX WITH LITTER RETURN ENTRY

BACKGROUND OF THE INVENTION

1. Field of the Invention

The present invention relates to litter boxes for pets, such as cats. More particularly, the invention comprises a litter box having improved means for retaining odors, misdirected waste and soiled litter within the box and preventing the spread of litter around the box.

2. Description of the Prior Art

Since man first domesticated the cat, it has been common to keep certain of them indoors, almost exclusively. They are easily trained to relieve themselves in a given location, and a box filled with an absorbent, granular material, "litter", has become an efficient means for containing the cat's waste. Unfortunately, keeping the soiled litter inside the litter box is a problem, since cats tend to scratch and shift the litter to cover the eliminated waste. Likewise, keeping misdirected waste within the confines of the box is important.

U.S. Pat. No. 6,494,165, issued to Russell Asbury on Dec. 17, 2001, discloses an ANIMAL LITTER BOX in which a base member is mated with an upper member encloses one end of the base member, leaving the second end uncovered. A screen grate seals off the enclosed end of the box such that only small particles of uncontaminated litter may pass through the grid of the screen. By prohibiting the animal from entering the enclosed end of the box, its waste is confined to the unenclosed end of the box. The soiled litter may be removed by picking up the box, tipping it so that the clean litter may pass through the screen, leaving the contaminated litter behind to be removed. After removing the contaminated litter, the box may be tipped forward to allow the clean litter to return to the open end of the box. Asbury does not provide a means of confining the litter and misdirected waste to the interior of the box, as does the present invention.

David Schwartz discloses a LITTER BOX ASSEMBLY in U.S. Pat. No. 6,237,534, issued on May 29, 2001. Schwartz presents a fully enclosed box, having a removable lid. Air holes around the upper perimeter of the walls of the box allow air passage into and from the interior of the box. Schwartz contains litter and waste within the box by means of an enclosed passage along one end of the box with an opening through a first wall, and entry into the interior of the box proximate an opposite wall such that an animal must walk the full width of the box before entering the inner chamber. The floor of the passage consists of a grate which allows any litter carried on the animal's feet to drop through into a removable tray below.

A CAT LITTER CONTAINER is disclosed in U.S. Pat. No. 6,205,953, issued to Sharron A. Ginn on Mar. 27, 2001. A base has upstanding sidewals which surround one end and both sides of the base, with a raised ramp area enclosing the second end. The ramp surface has a plurality of grated openings which allow litter from an animal's feet to pass through into a catchment tray beneath the ramp. While Ginn provides a grated ramp to prevent litter from being carried out of the box, it does not prevent litter from being thrown out of the box as the animal scratches or misdirected waste from going over the walls, as does the present invention.

In U.S. Pat. No. 6,065,429, issued on May 23, 2000, Douglas C. Crosse discloses a DISPOSABLE CAT LITTER BOX WASTE RECEPTACLE ASSEMBLY WITH ENCLOSURE in which a disposable, pasteboard base unit holds a standard litter box. A disposable, pasteboard cover unit fits over the litter box, slipping between the litter box and the base unit such that the litter box may be completely enclosed. A removable entryway allows an animal to enter and leave the box. The walls of the cover unit prevent litter and misdirected waste from being thrown from most of the perimeter of the box, but the entryway has no provision for preventing litter from being carried from the box, as does the present invention.

U.S. Pat. No. 5,676,090, issued to Earl W. Cannady, Jr. on Oct. 14, 1997, discloses a SCATTER-RESISTANT LITTER BOX. Cannady presents an enclosed base unit with an opening in one end of the cover unit. A raised ramp below the opening is covered with a carpet like material to trap litter carried on an animal's feet, thereby preventing the litter from being carried from the box. There is no provision for returning litter removed from the animal's feet to the box, as in the present invention, however.

Robert D. Toole, et al., disclose a CAT LITTER BOX in U.S. Pat. No. 5,590,623, issued on Jan. 7, 1997. A lower element is much like a conventional litter box, having a bottom and four generally vertical walls. An upper element, having four inwardly sloping walls and an open top mates with the lower element, thereby increasing the height of the walls of the box. The opening in the top of the upper element is surrounded by a lip which aids in keeping litter from being thrown over the walls as the cat scratches in the litter. Toole, et al., do not provide any means for preventing the animal from carrying litter out of the box, as does the present invention.

None of the above inventions and patents, taken either singly or in combination, is seen to describe the instant invention as claimed.

SUMMARY OF THE INVENTION

While providing a receptacle in which an animal may relieve itself indoors, cat litter boxes are typically a messy solution, at best. Because the walls are usually relatively low, every time the animal scratches in the litter, the odor from the waste is easily carried into the room where the box is located. Likewise, the low walls do little to contain the litter and waste within the box as the animal scratches in the litter or exits the box.

The present invention provides relatively high walls which aid in preventing the animal from throwing litter and misdirected waste over the walls as it scratches in the litter and containing the odors within the box. An entry/exit portal formed in one of the walls provides a lower area through which an animal may enter/exit the box without having to jump over the entire height of the walls. A grated deck extending outwardly from the base of the entry/exit portal allows litter caught in the animal's paws to drop though the grate and into a chute below the grate which returns the litter to the interior of the box. A litter scoop holder formed in the side of the litter box also provides means for litter retained in the scoop to be returned to the litter box as the scoop is stored. The higher sides of the box also provide increased privacy to an animal using the box.

Accordingly, it is a principal object of the invention to provide an improved litter box which is easily accessible by an animal.

It is another object of the invention to provide an improved litter box which will limit the amount of litter and waste which is thrown over the walls of the box by an animal scratching in the litter within the box.

It is a further object of the invention to provide an improved litter box which aids in removing litter from an animal's feet as it exits the box.

Still another object of the invention is to provide an improved litter box which will return litter removed from an animal's feet to the interior of the box.

An additional object of the invention is to provide an improved litter box with means for storing a litter scoop such that any litter remaining in the scoop will automatically be returned to the interior of the box.

It is again an object of the invention to provide an improved litter box which provides added privacy to an animal inside the box.

Yet another object of the invention is to provide an improved litter box which is economical, both in means of production/acquisition and in conservation of litter.

Still another object of the invention is to provide bag handle holders which will aid the user in placing scooped waste into a bag for disposal and return any waste missing the bag back to the interior of the litter box.

Yet another object of the invention is to provide a litter box which is easy to clean.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION OF THE PREFERRED EMBODIMENTS

Figure 1:
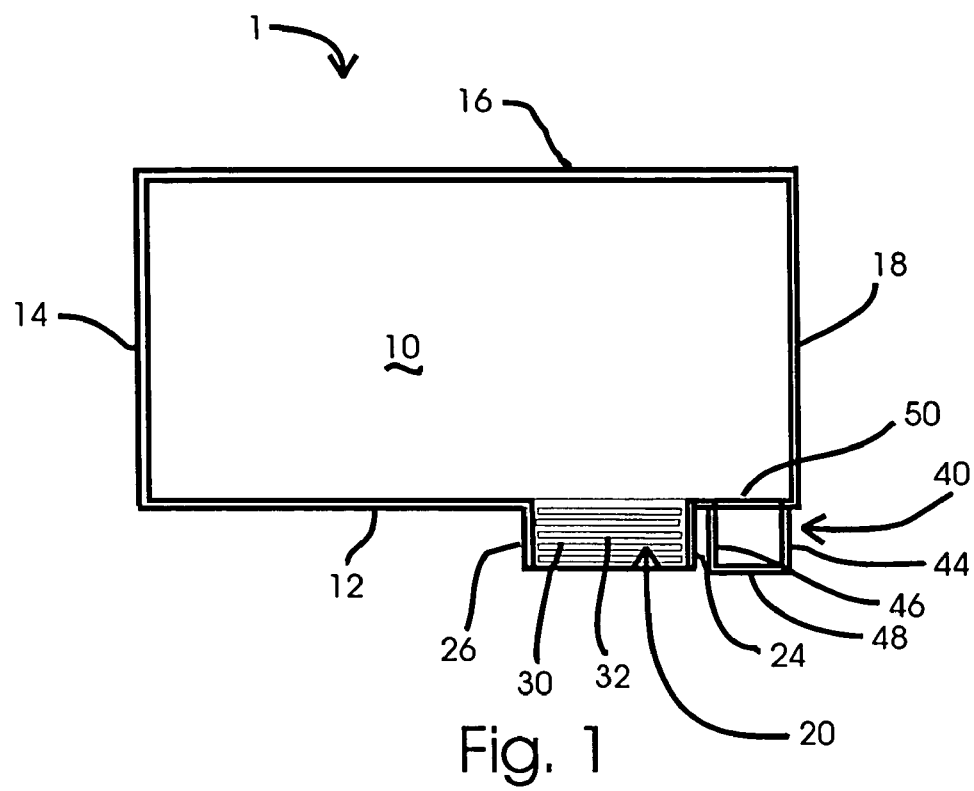
FIG. 1 is a plan view of a first embodiment of the litter box of the present invention showing the interior of the box.
Figure 2:
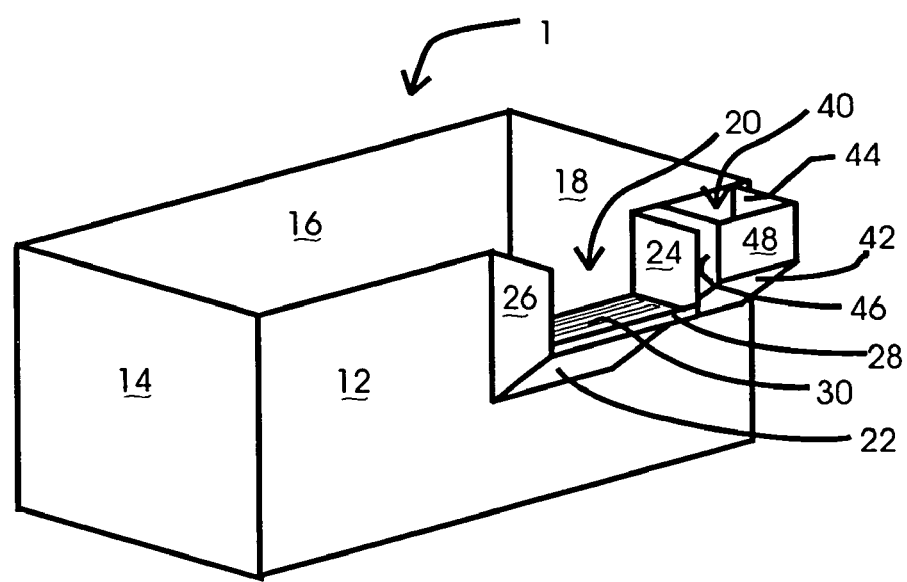
FIG. 2 is a front perspective view of the first embodiment of FIG. 1.
Figure 3:
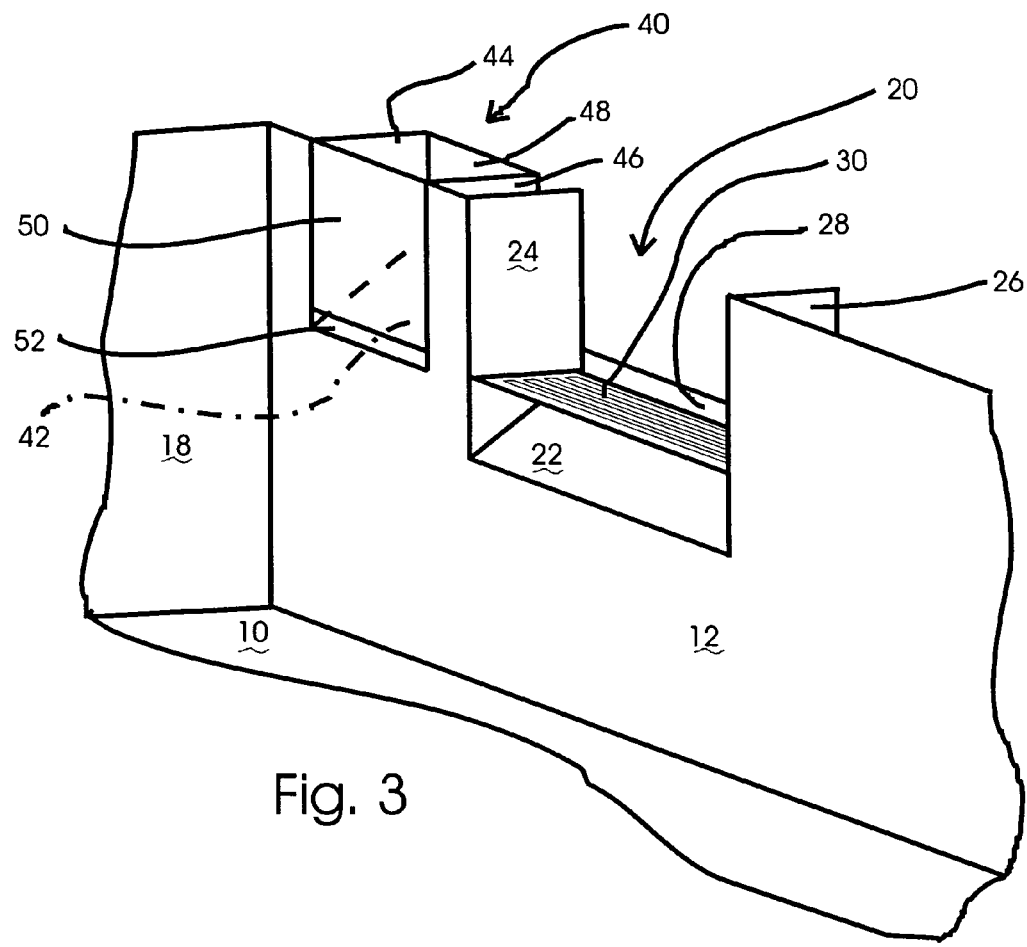
FIG. 3 is an internal detail of the entrance/exit and scoop storage litter return of the first embodiment of FIG. 1

In a first embodiment, as presented at FIGS. 1 thru 3, the litter box 1 of the present invention consists of a bottom 10, and four substantially vertical perimetric walls 12, 14, 16 and 18, each wall being substantially normal to each of the two adjacent walls, thereby forming a substantially rectangular, open topped box.

An entry 20 is formed by a gap in the upper portion of wall 12, such that an animal using litter box 1 must climb up to enter/exit the litter box 1. A sloping entry bottom 22 extends outwardly and upwardly from wall 12 at the lower edge of a gap in wall 12 forming entry 20. Likewise, a pair of substantially vertical entry walls 24, 26 extend outwardly from and substantially normal to wall 12 at the right and left edges, respectively, of the entry 20, abutting the right and left ends of entry floor 22, respectively. An entry lip 28 extends upwardly, substantially parallel to wall 12, from the free end of entry floor 22, abutting the lower portion of the entry walls 24 and 26. The entry 20, is thus bounded by the gap in wall 12, entry bottom 22, right and left entry walls 24 and 26, and entry lip 28, extending outwardly from wall 12. The upper edges of right and left entry walls 24, 26 are in a plane with the tops of walls 12, 14, 16 and 18.

An entry grate 30 (FIG. 3) extends inwardly from entry lip 28 such that it extends over entry floor 22, terminating substantially at the plane of wall 12. Apertures 32 in grate 30 allow any litter that an animal may carry from the litter box 1 to fall through to the sloping entry bottom 22 of entry 20, the slope allowing the litter to fall back into the interior of the litter box 1, thereby preventing it from falling outside of the litter box 1.

Similar to entry 20, a scoop rack 40 is formed in the upper portion of one of the walls 12, 14, 16, or 18. For the sake of illustration, scoop rack 40 will be described in wall 12. Like entry floor 22, scoop rack floor 42 extends outwardly and upwardly from wall 12 at the lower edge of a void in wall 12 forming scoop rack 40. A pair of substantially vertical scoop rack walls 44, 46 extend outwardly from and substantially normal to wall 12 at the right and left edges, respectively, of the scoop rack 40, abutting the right and left ends of scoop rack floor 42, respectively and a scoop rack front wall rises from the free end of scoop rack floor 42, abutting scoop rack walls 44, 46. Optionally, either a scoop rack wall 50 is situated in the void in wall 12 leaving a litter return aperture 52, or the litter return aperture 52 may be cut into wall 12, creating the void. When a litter scoop (not shown) is placed into the litter scoop, any litter clinging to the scoop may fall from the scoop, sliding down the scoop rack floor 42, returning to the interior of litter box 1.

Figure 4:
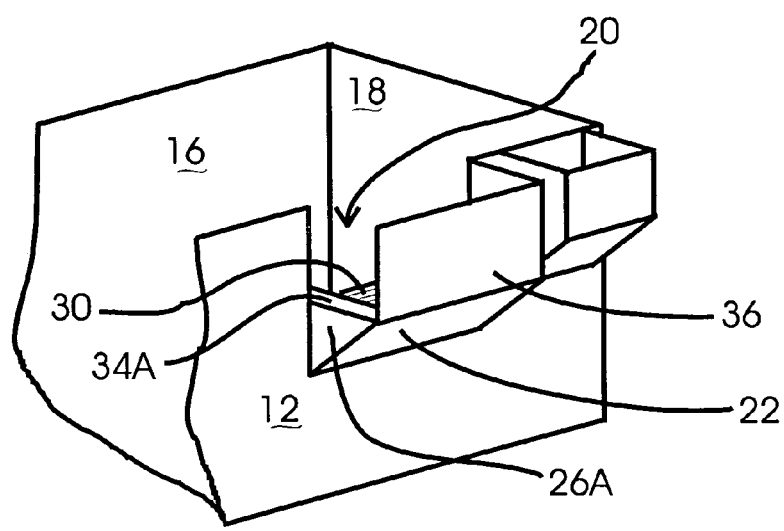
FIG. 4 is a plan view of a variation of the first embodiment of the litter box of the present invention.

In a variation of the first embodiment (FIG. 4), one of the vertical entry walls 24, 26 may be terminated at a point slightly higher than the upper surface of entry grate 30, thereby forming a lip 34A extending above the surface of entry grate 30. For the purposes of disclosure, wall entry wall 26 has been adapted in the second embodiment to entry wall 26A. A facing wall 36 rises from the upper edge of entry floor 22, abutting entry wall 24 and extending to the plane of the upper edge of walls 12, 14, 16 and 18. A side entry to entry 20 is formed, thereby forcing an animal entering the litter box 1 to turn a corner in order to pass through entry 20, rather than going straight through entry 20, and thereby minimizing the likelihood that a cat would just hop right over the grate.

Figure 5:
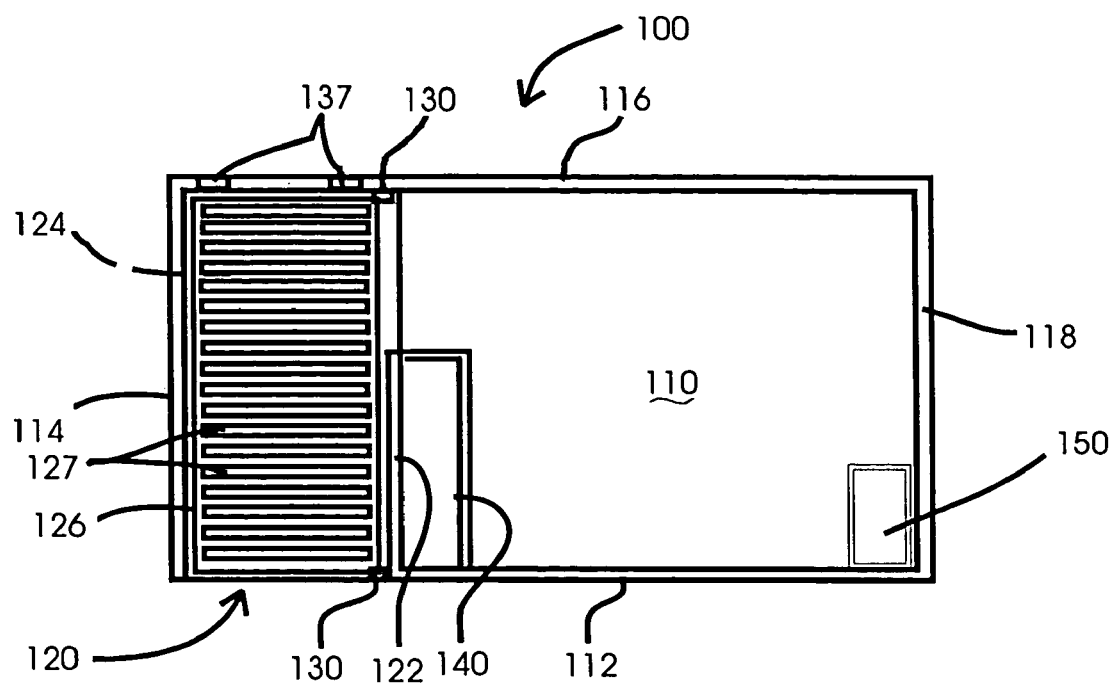
FIG. 5 is a plan view of a second embodiment of the present invention.
Figure 6:
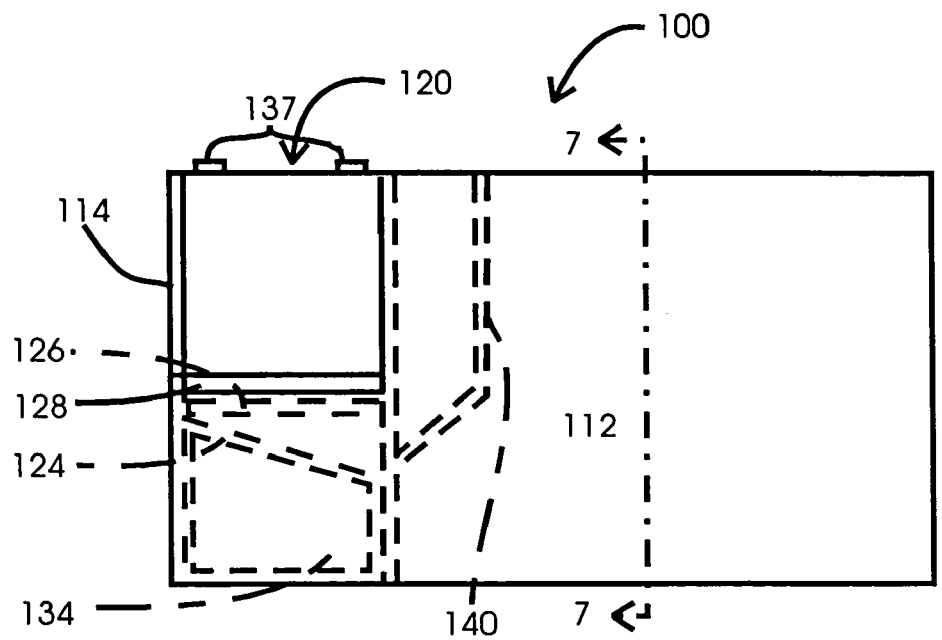
FIG. 6 is a front elevational view of the second embodiment of FIG. 5.
Figure 7:
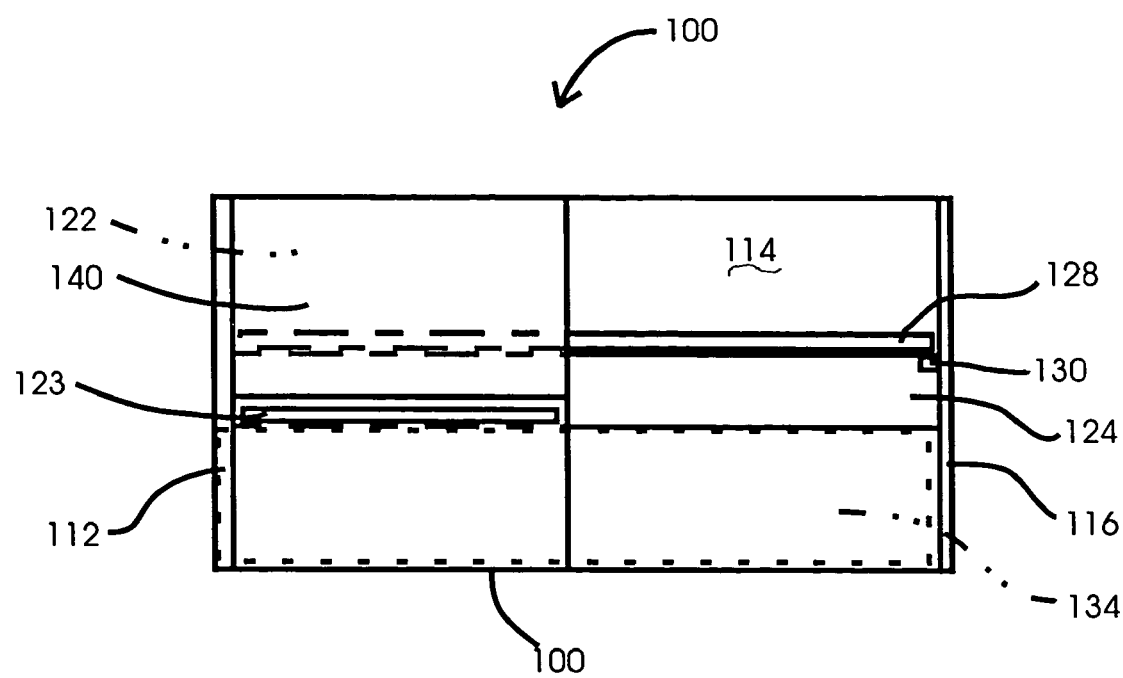
FIG. 7 is a cross sectional view of the second embodiment at line 7—7 of FIG. 5.

In a second embodiment, as disclosed at FIGS. 5 through 7, the litter box 100 of the present invention again consists of a bottom 110, and four substantially vertical perimetric walls 112, 114, 116 and 118, each substantially normal to each of the two adjacent walls, thereby forming a substantially rectangular, open topped box. An entry 120 is formed at one end of the litter box 100.

As in the first embodiment, a scoop rack 140 is formed in one of the walls 112, 114, 116, or 118 or the entry barrier wall 122. Reference is made to FIGS. 1 through 4 and the related description in relation to the formation of scoop rack 40 of the first embodiment, as the scoops racks 40 and 140 are substantially the same.

Entry 120 is formed at one end of the litter box 100. A gap is formed in an upper portion of wall 112 at a point adjacent wall 114. An entry barrier wall 122, normal to perimetric wall 112 and parallel to and at a determined distance from parametric wall 114 extends for a distance into the interior of litter box 100. A sloping entry platform 124 extends inwardly from wall 112 to wall 116 and from wall 114 to entry barrier wall 122. The gap in wall 112 that makes up entry 120 is defined by wall 114, the juncture of entry barrier wall 122 with wall 112, and the juncture of wall 114 and entry platform 124, slightly below an entry lip 128 formed in wall 112 at the gap.

Entry platform 124 slopes downwardly from wall 114 toward entry barrier wall 122 and the interior of litter box 100, terminating at a distance above bottom 110. The area between the lower edge of entry platform 124 and bottom 110 is closed by an extension of entry barrier wall 122. The slope of entry platform 124 allows litter carried onto the entry platform 124 to fall back into litter box 100, as will be further detailed hereinafter.

A entry grate 126, dimensioned to fit the space between walls 112, 114, 116 and entry barrier wall 122 rests atop the high edges of entry platform 124 and a pair of grate support ledges 130 formed in walls 112/116 to support the third and fourth corner of entry grate 126. Apertures 127 in entry grate 126 allow any litter clinging to an animal as it leaves the litter box 100 to fall through the grate 126, onto entry platform 124, and return to the interior of litter box 100 through slots 123 at above the juncture of entry platform 124 and entry barrier wall 122, thereby preventing litter from being carried from the litter box 100. It would be evident that the apertures in entry grates 30/126 could be in the form of elongates slots, round perforations or any other shape with equal effectiveness.

Optionally, a drawer 134 shaped and configured to fit the area between walls 112, 114 and 116, entry barrier wall 122, and entry platform 124 may be added, with access through wall 112, 114 or 116. Drawer 134 may be used to store incidental items used with litter box 100.

At least one bag clip 137 extends above the upper surface of at least one of the walls 112, 114, 116, and 118. The bag clip 137 is adapted to hold one side of a bag while an individual holds the opposite side, thereby facilitating the removal of animal waste and used litter from litter box 100. Bag clip 137 may be removably attachable, thereby allowing a user to place the bag in a position most convenient to him.

Optionally, a deodorizer receptacle 150, adapted to hold a box of baking soda or other air freshener/deodorizer or odor absorbant, may be incorporated into one of the sides 112, 114, 116, or 118, either as a permanent or detachable element.

It would be evident to one of ordinary skill in the art that a removable lid (not shown) could optionally be added to the litter box 1/100 in order to initially train an animal to use the entry 20/120, provide additional privacy for the animal, or further contain litter and waste. Likewise, a removable ramp (not shown) may be provided to aid a young animal in reaching entry 20/120 until it is large enough to do so unassisted.

It is to be understood that the present invention is not limited to the embodiments described above, but encompasses any and all embodiments within the scope of the following claims.

What is claimed is:

1. A litter box comprising:
a bottom and four walls, each of said four walls being substantially normal to said bottom and to each of two adjacent of said four walls the bottom and four walls creating an interior, entry means for allowing an animal to enter and exit said litter box at a determined location by climbing up onto said entry means, said entry means formed by a gap in an upper portion of said walls, thereby requiring the animal to climb up to enter and exit said litter box, said entry means further comprising litter return means for returning litter being carried on an animal's feet back to the bottom in the interior of said litter box as it steps onto the entry means, and scoop storage means for storing a litter scoop, said scoop storage means further comprising scoop litter return means for returning litter carried by the scoop which is placed in the scoop storage means back to the interior of said litter box.

2. The litter box, as defined in claim 1, wherein said entry means further comprises:
said gap being bounded by:
a sloping entry floor, said entry floor sloping upwardly and outwardly from a lower edge of the gap in said one of said walls,
a pair of entry walls, said entry walls extending outwardly and substantially normal to said one of said walls at each of the two sides of said gap in said one of said walls, and being joined to opposite side edges of said sloping entry floor, such that said entry walls each have a free upper edge and a free vertical edge,
an entry lip, said entry lip extending upwardly from the free edge of said entry floor and abutting a lower portion of the free vertical edge of each of said entry walls, and
an entry grate, said entry grate being substantially horizontal and confined within said entry walls, entry lip and entry floor;
said entry means allowing the animal to enter and exit said litter box by means of a substantially level platform located therein in the form of the entry grate.

3. The litter box, as defined in claim 2, wherein said litter return means comprises at least one aperture passing through said entry grate, said at least one aperture being configured to allow litter carried by the animal to fall through said at least one aperture, then slide down the slope of said entry floor and return to the interior of said litter box.

4. The litter box, as defined in claim 3, wherein said scoop storage means comprises a scoop rack, said scoop rack further comprising:
a sloping scoop rack floor extending upwardly and outwardly from one of said walls,
a pair of scoop rack walls extending outwardly from and substantially normal to said wall from which said scoop rack floor extends, and abutting each of two lateral ends of said scoop rack floor, and
a scoop rack facing wall, said scoop rack facing wall abutting a free edge of said scoop rack floor and each of said pair of scoop rack walls,
said scoop rack having an open top configured to receive the litter scoop.

5. The litter box, as defined in claim 4, wherein said scoop litter return means comprises:
a slot formed in said wall from which said scoop rack floor extends at the abutment of said scoop rack floor and said wall from which said scoop rack floor extends, within confines of said scoop storage means, such that any litter clinging to the litter scoop placed therein may fall from the scoop, slide down the sloping scoop rack floor, through said slot, and return to the interior of said litter box.

6. The litter box, as defined in claim 1, wherein said entry means further comprises:
- the gap being formed in an upper portion of a first of said walls substantially adjacent a second, abutting one of said walls, thereby requiring the animal to climb up onto said entry means to enter and exit said litter box, said gap having a first edge formed at or near said second wall,
- an entry barrier wall extending at full height for a distance into the interior of said litter box from said first wall, said distance being less than the distance between said first wall and an opposite of said walls of said litter box, said entry barrier wall extending substantially normal to said first wall at a second edge of said gap remote from said second wall, and
- an entry platform formed between said first wall and an opposite wall and located at a given level, and between said second wall and said entry barrier wall,
  - said entry platform being at a distance below a lower edge of said gap, and sloping downwardly from said second wall to said entry barrier wall,
- a reduced height portion of said entry barrier wall extending to said opposite wall up to the level of said entry platform, thereby enclosing an area bound by said entry barrier wall, said first wall, said second wall, said wall opposite said first wall, said bottom, and said entry platform.

7. The litter box, as defined in claim 6, wherein said litter return means comprises:
- a pair of grate support ledges formed in said first wall and an opposite wall in a plane which lies parallel to said bottom of said litter box and through said abutment between said entry platform and said second wall, said grate support ledges being above said entry platform, and
- an entry grate having apertures therethrough, said entry grate sized and dimensioned to fit within said first wall and said opposite wall and said second wall and said entry barrier wall, said entry grate resting on said entry platform where it abuts said second wall and said grate support ledges,
- said apertures of said entry grate being configured to allow litter clinging to the animal to fall through said apertures onto said entry platform and then slide down said entry platform fall back into the interior of said litter box through apertures formed in said entry barrier wall along an upper surface of said entry platform at its juncture with said entry barrier wall.

8. The litter box, as defined in claim 7, wherein said scoop storage means comprises a scoop rack, said scoop rack comprising:
- a sloping scoop rack floor extending upwardly and outwardly from one of said four walls,
- a pair of scoop rack walls extending outwardly from and substantially normal to said wall from which said scoop rack floor extends, and abutting each of two lateral ends of said scoop rack floor, and
- a scoop rack facing wall, said scoop rack facing wall abutting a free edge of said scoop rack floor and each of said pair of scoop rack walls,
- said scoop rack having an open top configured to receive the litter scoop.

9. The litter box, as defined in claim, as defined in claim 8, wherein said wall from which said scoop rack floor extends is said entry barrier wall.

10. The litter box, as defined in claim 8, wherein said scoop litter return means comprises:
- a slot formed in said wall from which said scoop rack floor extends at the abutment of said scoop rack floor and said wall from which said scoop rack floor extends, within confines of said scoop storage means, such that any litter clinging to the litter scoop placed therein may fall from the scoop, slide down the sloping scoop rack floor, through said slot, and return to the interior of said litter box.

11. The litter box, as defined in claim 10, wherein said litter box further comprises a drawer, said drawer having a bottom and four sides and being configured and dimensioned to fit under said entry platform and being slideably accessible through one of said four walls.

12. The litter box, as defined in claim 10, wherein said litter box further comprises at least one bag clip, said at least one bag clip being located at an upper edge of at least one of said walls and comprising means for holding an edge of a bag such that a user may hold the bag open with only one hand to facilitate in disposing of animal waste or soiled litter into the bag.

13. The litter box, as defined in claim 12, wherein said at least one bag clip is removably attachable to at least one of said walls, thereby allowing said at least one bag clip to be moved to a location on said litter box most convenient for an individual user.

14. The litter box, as defined in claim 1, wherein said litter box further comprises a deodorizer receptacle attached to one of said walls.

15. The litter box, as defined in claim 14, wherein said deodorizer receptacle is detachable.

* * * * *